United States Patent [19]

Goodloe et al.

[11] 4,153,818

[45] May 8, 1979

[54] TELEPHONE MULTILINE SIGNALING USING COMMON SIGNAL PAIR

[76] Inventors: Robert A. Frosch, Administrator of the National Aeronautics and Space Administration, with respect to an invention of; Radford R. Goodloe, Ormond Beach; Pierce C. Toole; Jerry L. Belt, both of Cocoa, all of Fla.; Donald B. Leininger, Yuma, Ariz.

[21] Appl. No.: 918,533

[22] Filed: Jun. 23, 1978

[51] Int. Cl.² .............................................. H04M 3/22
[52] U.S. Cl. ........................... 179/27 CA; 179/1 MN; 179/84 VF
[58] Field of Search ...... 179/16 AA, 27 FF, 175.2 C, 179/27 CA

[56] References Cited

U.S. PATENT DOCUMENTS 4,103,113 7/1978 Sato et al. ..................... 179/27 CA

*Primary Examiner*—William C. Cooper

*Attorney, Agent, or Firm*—James O. Harrell; John R. Manning; John G. Mannix

[57] ABSTRACT

A telephone multiline signaling system using a common signal pair of lines for transmitting coded electrical signals for selectively connecting one or more of a plurality of telephone lines to a telephone line or channel located at an operator's console. The operator can rapidly and automatically produce coded electrical signals by manipulating mechanical thumb wheel switches so as to instruct a service center to connect any one or more of a plurality of telephone lines to the console so as to enable the operator to listen and/or talk over a plurality of lines simultaneously. The system includes an on-site console having a plurality of mechanically operated thumb wheel switches provided thereon on which the desired lines to be connected thereto can be dialed in. Electrical coded signals are fed to a plurality of banks of line AND gates representing units, tens and hundreds, a group of channel gates and a command gate. These signals are gated out in a controlled manner to an encoder which generates tones that are transmitted over a single line to a communication service center.

7 Claims, 4 Drawing Figures

TELEPHONE MULTILINE SIGNALING USING COMMON SIGNAL PAIR

ORIGIN OF THE INVENTION

The invention described herein was made in performance of work under a NASA Contract, and is subject to the provisions of Section 305 of the National Aeronautics and Space Act of 1958, Public Law 85-568 (72 Stat. 435,002 U.S.C. 2457).

BACKGROUND OF THE INVENTION

The present invention relates to a manually operated system which enables the operator sitting at a console to selectively connect one or more telephone lines to the console so that the operator can listen to conversations carried on over a plurality of telephone lines and/or communicate thereover.

In many applications, and in particular in the space industry when monitoring space operations, it is necessary to listen to or have the capability of listening to information or audio conversation appearing on many different telephone lines. Heretofore, it is required a single line and a single receiver per telephone conversation.

Oftentimes an individual sitting at a console desires to listen to conversations appearing on many of the telephone lines that are being used in the launch of a missile. By listening to the conversation or information being transmitted over a plurality of lines, the operator can obtain an overall picture of the entire launch operation. Oftentimes it is necessary for the monitor to lower the volume on certain of the lines so that if signals or information appears on higher priority lines, it will stand out due to the increased volume.

SUMMARY OF THE INVENTION

The invention includes a system which enables the operator sitting at a console to automatically generate and transmit signals that are sent to a system center instructing the center to connect certain telephone lines to the channel which he is monitoring. The system includes one or more on-site consoles each of which has a plurality of mechanically operated thumb wheel switches carried thereon. By mechanically manipulating these thumb wheel switches electrical signals are generated representing a command request, a particular telephone line and the channel to which that particular telephone line is to be connected. The signals produced by the thumb wheel switches are, in turn, fed to a bank of AND gates, a group of channel gates, and a command gate. The banks of AND gates include one bank per switch deck. Three banks in this instance, one representing units, another representing tens and the third representing hundreds. The information dialed in the thumb wheel switch requesting the particular line is fed to these AND gates and are subsequently transferred through an encoder and decoder to the system center in a controlled manner. The encoder converts the electrical signals to Touch Tone pairs which are transmitted over a single pair of lines to a dual tone multifrequency decoder which decodes the tone signals and converts them back into binary electrical signals.

The signals generated by the thumb wheel switches are also fed to a group of channel gates corresponding to the channel provided on the on-site console. The signal indicates to the system center the particular channel to which the particular telephone line is to be connected.

A command gate is also provided for receiving signals generated by the thumb wheel switch, as well as by other pushbuttons so as to gate command signals through logic circuits to the dual tone multifrequency encoder and received by the dual tone multifrequency decoder for instructing the system center of a desired commands such as requesting it to make a connection indicating that the operator wants to talk as well as listen over a particular line.

The transfer of the coded signals from the thumb wheel switches is under control of various logic circuits, and in particular a shift register which produces signals sequentially on parallel outputs to sequentially convey the information from the various logic circuits.

Accordingly, it is an object of the present invention to provide a mechanical selector which includes switches that upon being manipulated, generates coded electrical signals that are transferred over a pair of lines to a system center requesting various services.

Another important object of the present invention is to provide a console which enables an operator to selectively connect any one of a plurality of telephone lines to a telephone line or channel associated with the console for enabling the operator to listen or communicate over those particular lines.

Another object of the present invention is to provide a simple means of selecting telephone lines with thumb wheel switches so as to automatically transmit Touch Tone pairs to system centers requesting various functional operations.

These and other objects and advantages of the invention will become apparent upon reference to the following specification, attendant claims and drawing.

DESCRIPTION OF A PREFERRED EMBODIMENT

Figure 1:
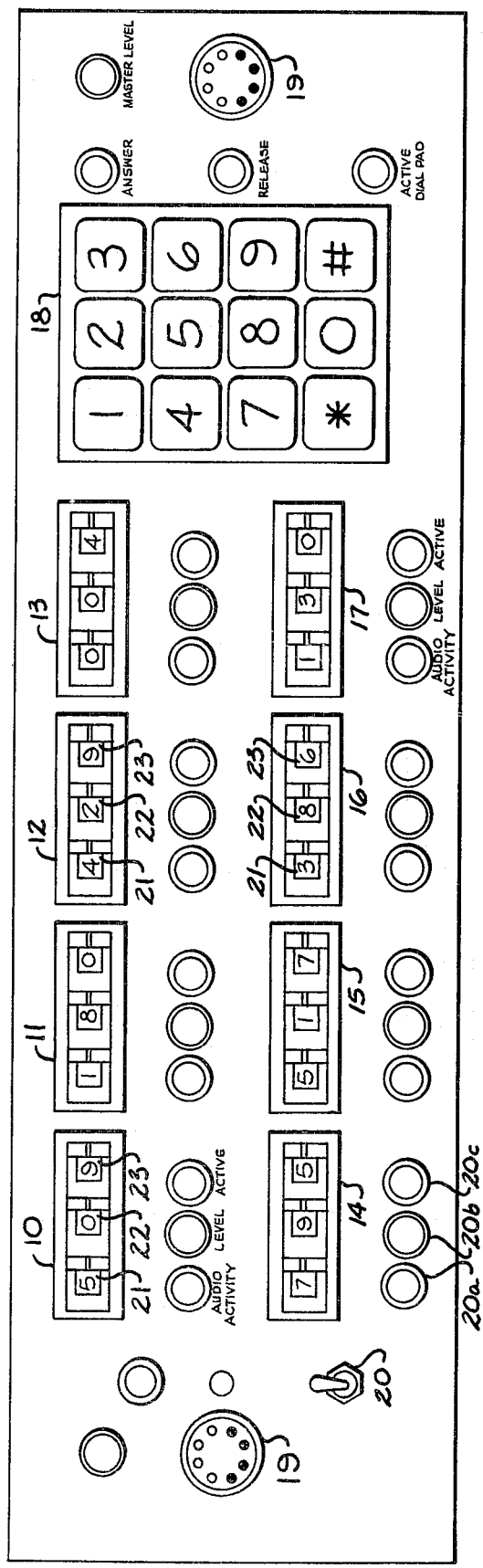
FIG. 1 is an elevational view illustrating a front panel of a console utilized by the operator in conjunction with the present invention.

Referring now to FIG. 1 of the drawing, there is illustrated a console panel which includes eight sets of thumb wheel switches 10 through 17 and a pushbutton dial tone pad 18. Connecting sockets 19 are provided for receiving a plug associated with a headset. The panel is also provided with an on-off switch 20 and each of the thumb wheel switches has associated with it an audio activity light 20a, a volume level knob 20b and an active button 20c.

The operator would have this console positioned in front of him so that if he wants to select a particular telephone line he would dial this number into one of the selector switches 10 through 17, each of which includes three thumb wheel switches 21, 22 and 23. After the thumb wheel switches 21, 22 and 23, have been manipulated so as to visually indicate the particular telephone line that is desired to be connected to the console, the system center makes the desired connection upon receiving an electrical coded signal produced after manipulating the thumb wheel switches.

Figure 2:
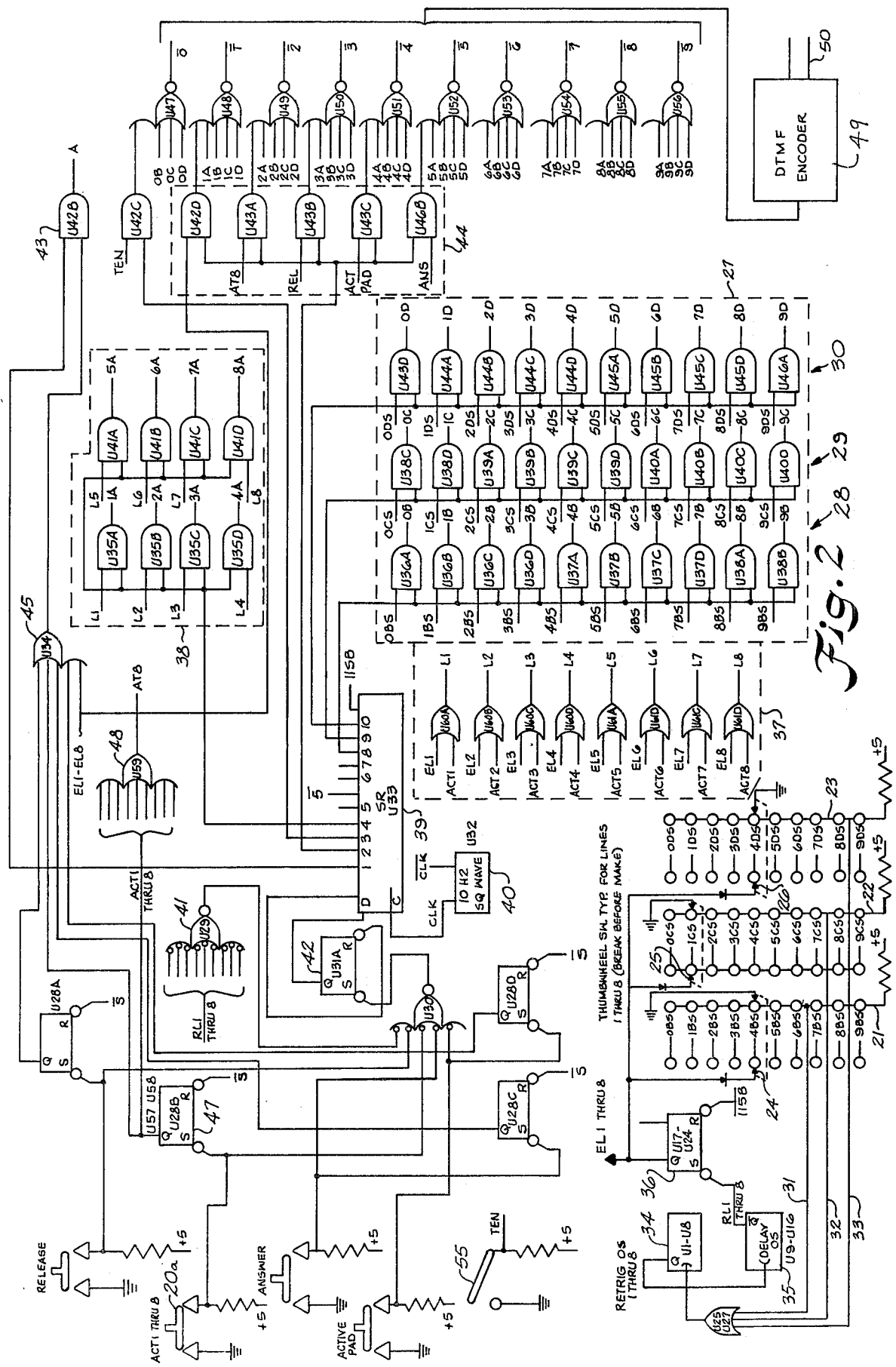
FIG. 2 is a schematic diagram of a transmitting portion of the circuit for enabling an operator to select and connect one or more of a plurality of telephone lines to a telephone channel associated with the console illustrated in FIG. 1.

Referring in more detail to FIG. 2 of the drawing, there is illustrated one selector which includes the thumb wheel switches 21, 22 and 23. The selector contact points 24, 25 and 26 can be moved to set the thumb wheel switches for a particular number. As illustrated in FIG. 2, the movable contact 24 associated with thumb wheel 21 is set for the number 4, the contact 25 associated with switch 22 is set for the contact 1 and the contact 26 associated with switch 23 is set at 4. This indicates that the operator wants to tie in to telephone line 414.

Prior to transferring any signals through the logic gate requesting a particular line, an initial command signal is sent to the system center requesting service.

The initial command signal is produced whenever any digit of thumb wheel switches 21, 22 or 23 is changed. Contact 24B, 25B or 26B on the second section of the switch is broken whenever the switch is moved. This allows the voltage on the switch section to rise because resistor 56, 57 or 58 is not grounded while the switch contact is between terminals. The +5 volts which stands on resistors 56, 57 or 58 is then applied to OR gate U25, U26 or U27 through lines 31, 32 or 33, shown in the lower left hand corner of FIG. 2. This OR gate, in turn, passes the signal through to the input terminal of one of eight one-shot multivibrators 34 which is identified in the block as U1–U8. The output of the retriggerable one-shot multivibrator produces a leading edge of an output signal. Each time one of the thumb wheel switches 21, 22 or 23 is moved it retriggers this multivibrator 34. The multivibrator 34 will time out in a preset time from 3 to 10 seconds, say approximately seven seconds, producing a trailing edge which is utilized in the circuit for performing subsequent functions. This trailing edge signal is fed into a delay one-shot multivibrator 35 which, in turn, produces an output signal that is used for activating a set reset flipflop 36. The flipflop 36, in turn, produces an output signal EL1 that is connected to one input of OR gate U60A located in the bank of OR gates enclosed in the dotted line box 37, and to the thumb wheel switches.

The Q output of RS flipflop 1C 36, U17 for the channel shown, is connected through thumb wheel switch contacts 24A, 25A and 26A, according to the number selected, to AND gates illustrated in box 27 enclosed by the dotted line.

The thumb wheel switches are connected to a plurality of banks of AND gates illustrated in the box 27 enclosed by the dotted line. These three banks of AND gates, identified by the reference characters 28, 29, and 30 are provided for receiving the signals from the correspondingly labeled terminal of the switches 21, 22 and 23. The bank of AND gates 30 are provided for receiving a signal representing units, the bank of AND gates 29 are provided for receiving signals representing tens and the bank of AND gates 28 are provided for receiving the signals representing one hundreds. Since the thumb wheel switches, 21, 22 and 23 have been set to select the line 414 there is a signal applied to one input terminal of AND gate U37A, U38D and U44D of the banks 28, 29 and 30 of the AND gates, respectively.

It is to be understood that there are eight of the one-shot multivibrators 34, eight of the delay one-shot multivibrators 35 and eight of the reset flipflops 36. Each of the output terminals of the respective flip-flops 36 is connected to one input of the corresponding OR gate U60A through U61D located in the dotted line box 37.

The outputs of the OR gates 37 are appropriately connected to an input terminal of one of the channel gates located in dotted box 38. In this particular situation, a particular signal L1 is applied to the input terminal of AND gate U35A for placing an output signal 1A on its output terminal thereof.

At this point in the discussion the signal has been stored in the block 27 which includes the bank of AND gates 28, 29 and 30 that indicates the particular line desired to be connected. Information is also stored in the block of AND gates 38 to indicate the particular line or channel that the information is desired on.

Whenever the one-shot multivibrator 34 times out a binary 1 is set into the first position of the shift register 39 identified by the character U33. The timing operation for the shaft register 39 is disclosed in more detail in FIG. 4 wherein the top line indicates the clock signals produced by a clock 40 that is connected to a shift terminal of the shift register 39 for shifting a signal throughout the shift register. The signal coming from the output of delay one-shot 35 is also fed to one of the inputs of the OR gate 41 identified as U29. This causes a signal to be applied to the S input terminal of reset flipflop 42 which, in turn, produces an output signal on its Q output lead that is fed into the shift register 39 data input. The clock then shifts this binary 1 throughout the shift register sequentially placing a 1 on each of the output terminals in sequence labeled 1 through 10. As the binary 1 is shifted the first time the T output of 39 sends a signal back to the R reset terminal of reset flip-flop 42 to reset the flipflop. After the first 1 is inserted into the shift register, it is then followed by a series of zeros. As the clock 40 indexes the 1 within the shift register 39 to the first position, it causes a signal to be fed out through AND gate 43 labeled U42B to produce an A output signal thereon. When the 1 is indexed to the second position of the shift register 39, an output signal is produced on the second output terminal which is fed to the input terminals of the AND gates in box 44 and identified as U42D, U43A, U43B, U43C and U46D. The output of these AND gates are, in turn, connected to the inputs of corresponding OR gates U48, U49, U50, U51 and U52. This produces a control output signal.

As the pulse in the shift register 39 is indexed to the third position an output signal is produced which is fed to the input terminal of AND gate U42C. This is referred to as the stacking gate and will be discussed more fully below.

When requesting service from the service center prior to identifying a line, a special code has to be sent to the service center. This coded signal is referred to as signal A1 indicating there has to be an output on AND gate 43 which produces an A signal and an output from OR gate U48 representing a 1 prior to the system accepting the request to be tied into a particular line.

The way this is accomplished is that the output signals EL1 through EL8 as previously mentioned, are fed through the bank of OR gates 37 and are used for enabling the AND gates shown in block 38 identified as U35A, U35B, U35C, U35D, U41A, U41B, U41C and U41D. The EL1 through EL8 signal is also fed through the OR gate 45 identified as U34 for enabling the AND gate 43 as well as the OR gate U48 by means of the AND gate U42D. The second bit of information from the shift register 39 is fed to the AND gate U42D and when this occurs, an output signal is produced by the output of OR gate U48 indicating a 1. As previously mentioned, the first bit from the shift register 39 produced an output signal A on the AND gate 43. Therefore, the code A1 is now produced after the shift register has been indexed through the first two positions. This code A1 is forwarded to the service center indicating that service is being requested.

As the signal is indexed to the third position of the shift register, a signal is fed to the AND gate U42C to determine if there is a stack signal present. If the system is not stacked the output from AND gate U42C is low indicating a non-stack condition indicating that the operator of the console is only operating on channels 1 through 8. If a second console was added the stack lever 45 would be closed on installation, indicating such. For the purpose of this explanation we will assume that only one console is being utilized and therefore the circuit is in a non-stack condition.

The fourth bit of information from the shift register is fed to the other input of OR gate U35A which is carried within the bracketed box 38. U35A has on its other input a signal L1 which is fed through the gate to the OR gate U48 for producing a 1 output thereon.

So the fourth bit of information from the shift register U33 has caused a 1 to be sent out on the output of U48 indicating that channel 1 is to be serviced.

The fifth bit of information from the shift register 39 is not utilized since this time is necessary for the system center to respond to this request for service on channel 1.

The next output signal from the shift register 39 which is utilized is the eighth bit which is fed to one input of the AND gates forming part of the bank 28. Since the AND gate U37A is the only AND gate that has a signal on its other input a 4B signal is produced on the output of AND gate U37A. The 4B signal is, in turn, connected to one input of OR gate U51 for producing a signal on its output representing the number 4.

The ninth bit from the shift register 39 is utilized for activating one of the inputs of the bank of AND gates 29, and in particular AND gate U38D which has a signal on its other input causing an output signal 1C to appear on its output terminal. This 1C output signal is, in turn, connected to one of the input terminals of OR gate U48 producing a signal on its output representing a 1.

The tenth bit from the shift register 39 activates the AND gates included in the bank 30 and in particular AND gate U44D producing an output signal 4D thereon since an input signal was on the other input terminal of AND gate U42D. This output signal 4D is applied one of the input terminals of OR gate U51 producing a signal on its output representing a 4. Therefore, the bits from the eighth, ninth and tenth terminals from the shift register 30 sequentially activated the banks 28, 29 and 30 for producing output signals on the bank of OR gates shown on the right in FIG. 2 indicating that line 414 is the line that is desired to be connected to channel 1 of the console. So at this time in the description of the circuit shown in FIG. 2, an output signal A1 has been produced indicating that service is requested and an output signal on 1 has been produced indicating that it is desired that a line be connected to channel 1 on the console and that the line that is to be connected is line 414. Since the command signal is A1, the line is only tied to channel 1 to enable the operator to listen to conversations on that line. Other command signals can be produced to enable the operator to talk on that line as well as listen.

For example, if the activate button 20a is depressed than a different command signal is sent out enabling the operator to talk as well as listen to the line that is connected. When the active button 20a is depressed it sets reset flipflop 47 identified as flipflop U28B, U57 and U58. A high Q signal is produced on the output line that is fed over to OR gate 45 and generates a 1 on its output that is, in turn, fed to AND gate 43 identified as U42B. When the shift register is indexed to the first position a bit is fed to the other input of AND gate 43 which, in turn causes the AND gate to produce a signal on its output representing an A. Since we are now requesting an activate signal identified by the code A2, we must energize OR gate U49 to obtain a signal on its output representing a 2. This is accomplished by sending the same output signal from flipflop 47 to one of the input terminals of OR gate 48. The output of OR gate 48 identified as U59 is fed to one input of AND gate U43A forming part of the bank of AND gates 44. It is to be understood there is a flipflop 47 for each of the activated buttons 20a associated with the respective thumb wheel switches. The other input of AND gate U43B receives a second bit from the shift register 39 causing an output signal to be produced that is fed through OR gate U49 producing an output signal thereon indicating a 2. Therefore, the code which represents active code A2 is produced. However, it is still necessary for the system to know what channel it is desired this active condition to be applied to. Since we have previously said that we want it to be applied to channel 1, this is accomplished by using the same output signal from flip-flop 47 and applying it to the ACT 1 input terminal of OR gate U60A producing an L1 signal on its output. This L1 signal is, in turn, applied to an input terminal of AND gate U35A causing a signal to be produced on its output terminal indicating a 1A. It is transmitted out of AND gate U35A by the fourth bit from the shift register 39 to one input terminal of OR gate U48 for producing a signal 1 on its output line. Therefore, you are telling the system center that you desire to be active on line 1.

The shift register continues shifting and when it reaches the fifth bit it resets flipflop 47 back to its initial condition. The release, the answer, and the active pad are all done in the same fashion. They are duplicate circuits therefore such will not be discussed.

Figure 3:
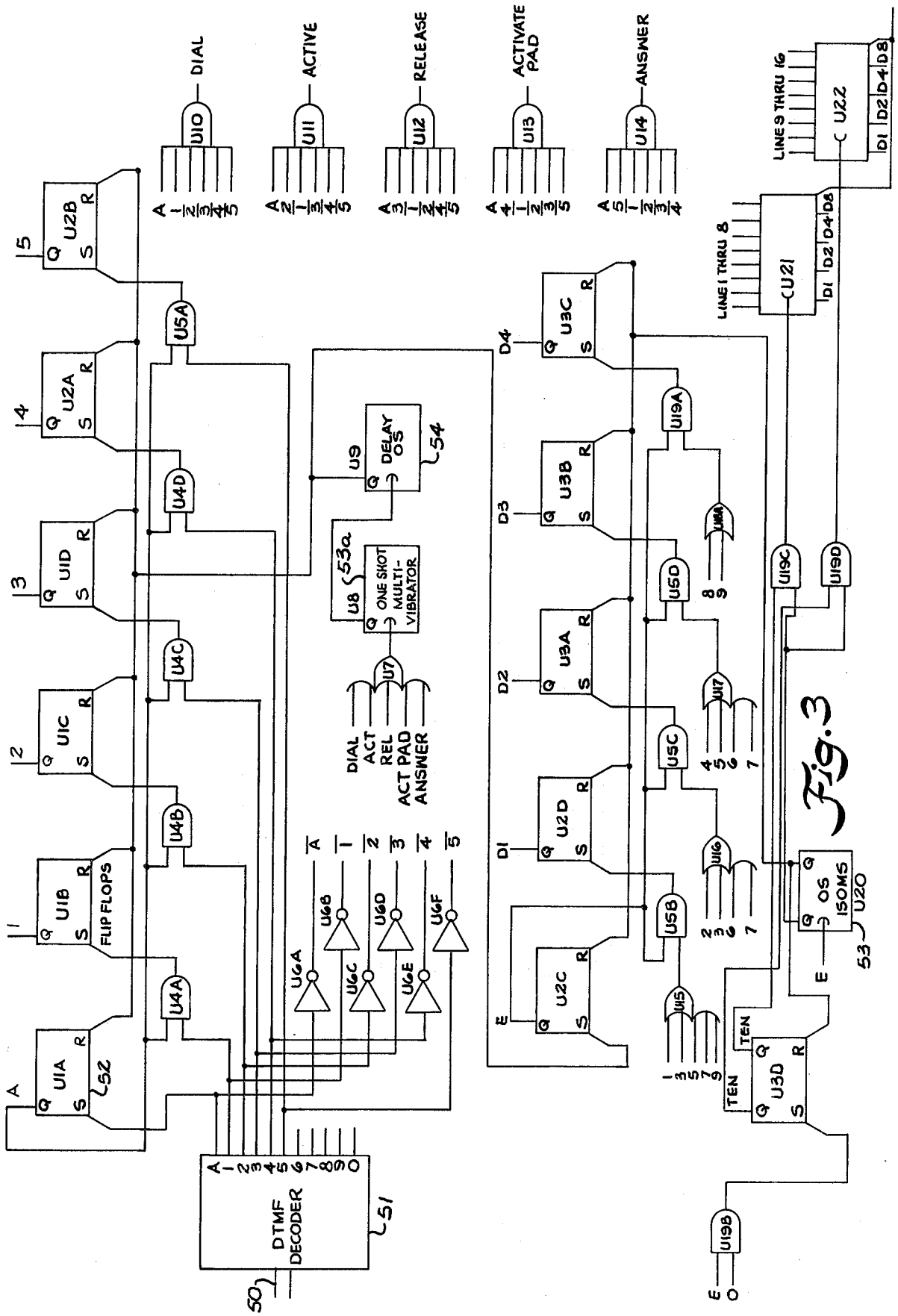
FIG. 3 is a schematic diagram of a receiver portion of the system and in particular, the logic circuit associated therewith.

Whenever a signal appears on the output terminals of the OR gates U47 through U56 it is fed to a dual tone multifrequency encoder 49 that converts these binary signals into tone frequency signals for being transmitted over a pair of lines 50 to a receiver. As illustrated in FIG. 3, a receiver includes a dual tone multifrequency decoder 51 which converts these tones back into binary signals. FIG. 3 is a logic diagram for the circuit that receives the request for service and decodes the signal to identify the particular channel upon which it is desired that the telephone be connected.

The circuit of FIG. 3 does not contain the circuitry that decodes the signal identifying the particular line being called. Any suitable conventional circuitry could be utilized for this. As the A1 signal which indicates that service is requested is transmitted over the line 50, the A Touch Tone signal is received by the DTMF decoder 51 and the A output terminal goes high which sets flipflop 52 identified as U1A. This causes the Q output signal thereon to go high which enables AND gates U4A, U4B, U4C, U4D, and U5A. The next signal decoded by the decoder 41 is the tone representing the 1. This is decoded in the decoder and the 1 output goes high which then passes through AND gate U4A and sets flipflop U1B making the Q go high. When the 1 is fed out from flipflop U1B, as well as the A from U1A, this enables AND gate U10 to produce an output signal on its output U10 indicating a dial request. The outputs A, 1, 2, 3, 4, and 5 are inverted and programmed to AND gates U10, U11, U12, U13 and U14. Since the A1 signal represents the dial command the gate U10 has been activated. Other commands such as active, release, active pad and answer will similarly be gated through gates U11, U12, U13 and U14, respectively. The dial output signal from gate U10 is applied back through OR gate U7 to a one-shot multivibrator 54a which, in turn, produces an output signal that is fed to delay one-shot multivibrator 54. The output of delay one-shot multivibrator 54 is fed back to the flipflops U1A, U1B, I1C, U1D, U2A, and U2B for resetting these flipflops after a dial signal has been produced.

so at this time the system center has been informed that the command signal is dialed but so far it has not been informed as to what channel the dial signal is to be supplied. Since it is desired that service be applied to channel 1 after a predetermined delay caused by delay one-shot 54, a signal is fed to the input terminal pf flipflop U2C causing its output terminal to go high. This output signal is identified as E. This E or enable signal is applied to the input terminal of AND gates U5B, U5C, U5D, U19A and U19B and one-shot U20. So these gates are now waiting to receive the next decoded signal out of the decoder for determining what channel the service is requested on.

The second transmitted dual tone pair comes along and since it represents a 1 it gets decoded and applies a signal on output terminal 1 of decoder 51. This 1 is applied to one input of OR gate U15. The output terminal of OR gate U15 is connected to the other input of AND gate U5B which passes a signal therethrough to the set input of flipflop U2D and sets this flipflop making the D1 signal to appear on the output terminal Q. The D1 output signal is applied to an input terminal of the latching gate 21 latching in channel 1.

The E output from flipflop U2C is applied through one-shot multivibrator 53 causing the output terminal Q to go high which, in turn, places an input signal on one of the terminals of AND gate U19C. Since the stack switch 55 as shown in FIG. 2 had not been closed, there is no input signal on the other input terminal of AND gate U19D therefore, the latching gate U22 is not activated. The latching switch 55 causes either a signal or no signal to the flipflop U3D which selectively enables AND gates U19C and U19D to latch in either the latching gate U21 or U22 responsive to an input signal appearing on one of the input leads D1, D2, D4 and D8. Since the channel that we want information to be applied is channel 1, only the latching gate U21 will be activated and channel 1 thereof will be active. Signals applied to the input terminals D1, D2, D4 and D8 from the flipflops U2D, U3A, U3B and U3C are in binary form and are decoded by the gates U21 and U22.

Figure 4:
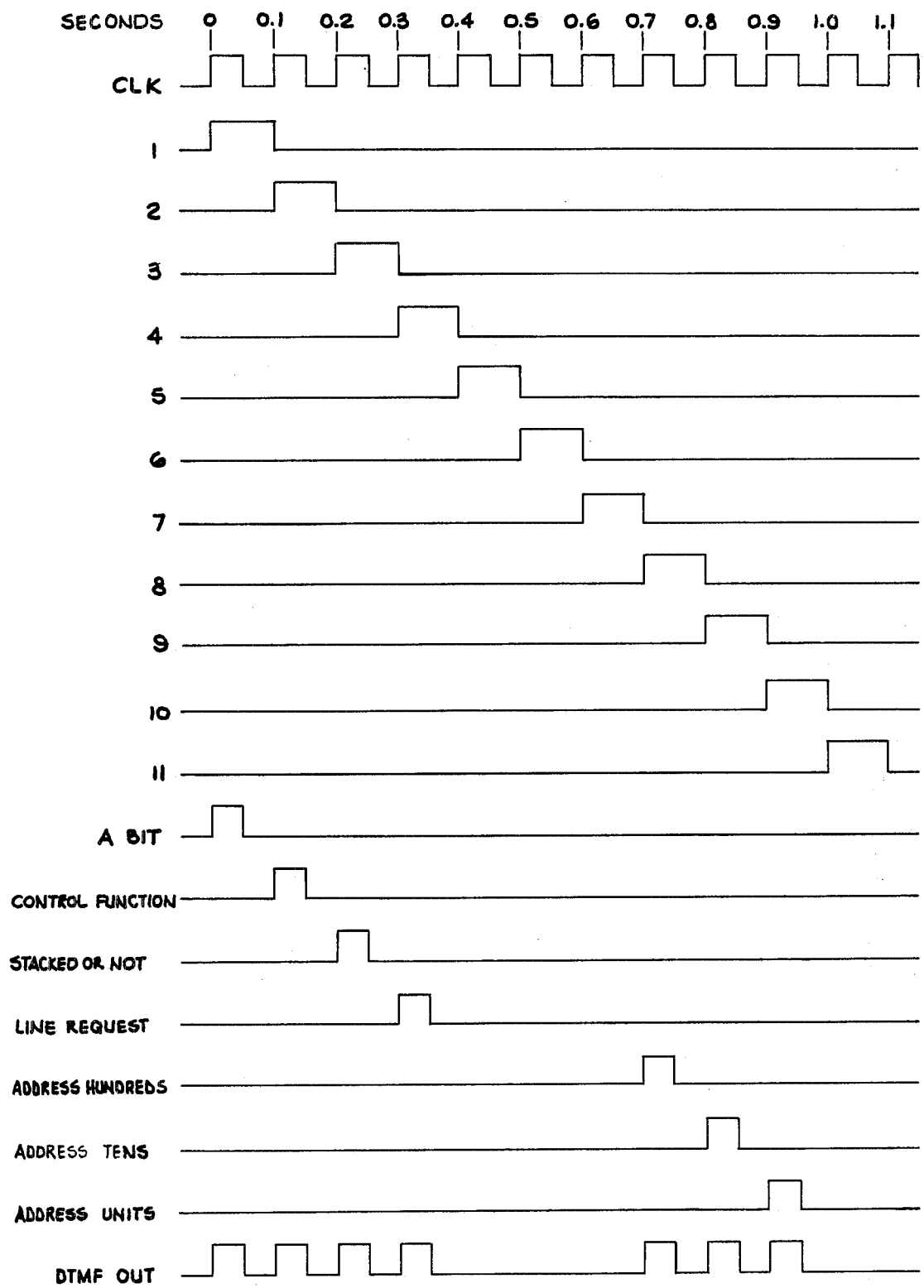
FIG. 4 is a timing diagram utilized in connection with the circuits of FIGS. 2 and 3.

FIG. 4 illustrates the timing cycle for the circuit and in particular the clock pulses adjacent the top line with the output bits from the shift register shown in the lines 1 through 11. The other control bits appropriately labeled are applied as indicated.

In summarizing the operation of the circuit, an operator merely has to manipulate the thumb wheel switches on a console and depress buttons to generate electrical coded signals that can be received and analyzed by computers for connecting various telephone lines to channels of the console. The commands which are presented to the service center informs the service center system of the type of service requested.

While a preferred embodiment of the invention has been described using specific terms, such description is for illustrative purposes only, and it is to be understood that changes and variations may be made without departing from the spirit or scope of the following claims.

What is claimed is:

1. A mechanical selector for generating electrical coded signals representing a plurality of different commands regarding connections between a group of on-site telephone channels and a plurality of remote telephone lines, said selector comprising:
   an on-site console;
   a plurality of mechanically operable sets of switches carried on said console, one set of switches for each of said respective channels;
   means for mechanically manipulating said sets of switches generating electrical signals representing a command request, a particular telephone line, and the channel that said particular telephone line is requested to be connected to;
   a plurality of banks of AND gates representing units, tens, and hundreds;
   means for connecting said signal representing said particular channel to designated gates of said plurality of banks of AND gates;
   a group of channel gates corresponding to the channels at said on-site location;
   means for connecting said signal representing the channel to which said particular telephone line is to be connected to a designated channel gate;
   a command gate;
   means for connecting said signal representing a command request to said command gate;
   a shift register having a plurality of parallel output terminals with respective ones of said output terminals being connected to said command gates, said channel gates, and said AND gates;
   means for generating a shift pulse responsive to manipulations of said switches for shifting a signal through said shift register for enabling said command gates, said channel gates and said AND gates;
   whereby output signals are produced by said command gates, said AND gates, and said channel gates identifying a particular command, a particular remote telephone line, and the on-site telephone channel to which the particular telephone line is to be connected.

2. The selector as set forth in claim 1 further comprising:
   a delay means interposed between said mechanically operable sets of switches and said means for generating a shift pulse providing a predetermined delay between the time said switches are manipulated and said output signals are produced by said command gates, said AND gates, and said channel gates.

3. The selector as set forth in claim 1 wherein each of said plurality of mechanically operable sets of switches comprise:

a plurality of thumbwheel switches representing units, tens, and hundreds, each of said switches including ten different settings which are manipulated to select a particular telephone line for connection.

4. The selector as set forth in claim 3 wherein each of said plurality of banks of AND gates comprise:
   ten AND gates;
   each of said AND gates having a pair of input terminals;
   means for connecting one input terminal of said AND gates to a respective setting on said thumbwheel switches for receiving a signal from said selected setting of said thumbwheel switches; and
   means for connecting an output terminal of said shift register to the other terminal of said AND gates for enabling said AND gates which are connected to said selected setting on said thumbwheel switches.

5. The selector as set forth in claim 1 further comprising:
   a bank of OR gates;
   said OR gates having a plurality of input terminals and an output terminal;
   means for connecting the outputs from said AND gates, said channel gates and said command gates to selective input terminal of said OR gates so as to produce signals on the output terminals of said OR gates representing a selected command, a particular remote telephone line and the on-site telephone channel to which the particular telephone line is to be connected.

6. The selector as set forth in claim 5 further comprising:
   a dual tone multifrequency encoder connected to the outputs of said bank of OR gates for converting said signals appearing on the outputs of said OR gates to tone signals;
   a dual tone multifrequency decoder;
   a tone transmission line connected between said encoder and said decoder for transmitting signals therebetween; and
   a logic circuit connected to the output of said decoder performing a particular function responsive to said decoder converting said tone signals back to binary signals.

7. A mechanical selector for generating electrical signals representing a plurality of different commands regarding connections between a group of on-site telephone channels and a plurality of remote telephone lines, said selector comprising:
   an on-site console;
   a plurality of thumbwheel switches representing units, tens and hundreds carried on said console, each of said thumbwheel switches including ten different settings;
   means for mechanically manipulating said thumbwheel switches generating electrical signals representing a command request, a particular line, and the channel requested for said particular line;
   a plurality of banks of AND gates representing units, tens and hundreds;
   means for connecting said signal representing said particular telephone line to designated gates of said plurality of banks of AND gates;
   a group of channel gates corresponding to the channels of said on-site location;
   means for connecting said signal representing the channel to which said particular telephone line is to be connected, to a designated channel gate;
   a command gate;
   means for connecting said signal representing a command request to said command gate;
   a shift register having a plurality of parallel output terminals with respective ones of said output terminals being connected to said command gates, said channel gates, and said AND gates;
   means for generating a shift pulse responsive to manipulating said thumbwheel switches for shifting the signal through said shift register for enabling said command gates, said channel gates and said line gates;
   a dual tone multifrequency encoder;
   means for connecting the outputs of said channel gates, said command gates and said AND gates to said dual tone multifrequency encoder for converting the output signals on said AND gates, channel gates and said AND gates to tone signals; and
   means for transmitting said tone signals to a service center for carrying out the functions requested thereby.

* * * * *